(12) United States Patent  (10) Patent No.: US 7,646,563 B2
Oishi  (45) Date of Patent: Jan. 12, 2010

(54) RECORDING DISK CARTRIDGE HAVING A PLURALITY OF FLEXIBLE RECORDING DISK MEDIA

(75) Inventor: Kengo Oishi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 597 days.

(21) Appl. No.: 11/180,685

(22) Filed: Jul. 14, 2005

(65) Prior Publication Data

US 2006/0041900 A1   Feb. 23, 2006

(30) Foreign Application Priority Data

Aug. 18, 2004  (JP) .............................. 2004-238652

(51) Int. Cl.
*G11B 5/012* (2006.01)
*G11B 17/08* (2006.01)
*G11B 17/02* (2006.01)
*G11B 7/24* (2006.01)
*G11B 23/03* (2006.01)

(52) U.S. Cl. .................. 360/98.02; 360/98.08; 720/721

(58) Field of Classification Search ................ 720/723, 720/721; 360/133, 98.02, 98.08
See application file for complete search history.

(56) References Cited

U.S. PATENT DOCUMENTS

| 3,724,652 A * | 4/1973 | Francini et al. .......... 206/308.3 |
|---|---|---|
| 4,149,207 A * | 4/1979 | Porter et al. ................. 360/133 |
| 4,174,039 A * | 11/1979 | Frankhuizen ............ 206/308.3 |
| 4,320,430 A * | 3/1982 | Vogt ........................... 360/133 |
| 4,604,664 A * | 8/1986 | Barski ...................... 360/99.12 |
| 4,607,304 A * | 8/1986 | DeMoss et al. ............. 360/133 |
| 4,974,103 A * | 11/1990 | Iftikar et al. ............. 360/97.01 |
| 6,111,726 A * | 8/2000 | Clark et al. ................. 360/133 |
| 6,292,461 B1 * | 9/2001 | Kikuchi et al. ............. 720/721 |
| 6,441,997 B1 * | 8/2002 | Blum ........................ 360/133 |
| 2003/0210497 A1 * | 11/2003 | Aoishi et al. ................ 360/133 |
| 2003/0231427 A1 * | 12/2003 | Nakamikawa ............... 360/133 |
| 2006/0026606 A1 * | 2/2006 | Oishi ........................ 720/600 |
| 2006/0050437 A1 * | 3/2006 | Shiga et al. ................. 360/133 |

FOREIGN PATENT DOCUMENTS

| JP | 62089288 A | * | 4/1987 |
| JP | 04176069 A | * | 6/1992 |
| JP | 2004-22011 A | | 1/2004 |

* cited by examiner

*Primary Examiner*—Andrea L Wellington
*Assistant Examiner*—Adam B Dravininkas
(74) *Attorney, Agent, or Firm*—Sughrue Mion, PLLC (57) ABSTRACT

A recording disk cartridge includes a plurality of flexible recording disk media, a rotational member, and a cartridge case. The rotational member holds the recording disk media so that the recording disk media simultaneously rotate. The cartridge case provides a rotationally free housing for the recording disk media and the rotational member. The cartridge case has an opening to allow an end portion of the rotational member to be exposed to an outside of the cartridge case. The recording disk cartridge has an elastic member which provides a force to thrust the rotational member toward the opening.

8 Claims, 8 Drawing Sheets

RECORDING DISK CARTRIDGE HAVING A PLURALITY OF FLEXIBLE RECORDING DISK MEDIA

BACKGROUND OF THE INVENTION

1. Field of the Invention

The present invention relates to a recording disk cartridge comprising a plurality of flexible recording disk media.

2. Description of the Related Art

Conventionally, as a recording disk medium a flexible recording disk medium is known where a magnetic layer is formed on both faces of a disc-form support body consisting of a flexible material such as a polyester sheet. Although the magnetic disk medium has a merit of speedily accessing data in comparison with a magnetic tape, on the other hand, it has a demerit of a memory capacity being small because a recording area thereof is small.

In order to solve the demerit of the flexible magnetic disk medium, it is conventionally disclosed a magnetic disk cartridge for housing a plurality of magnetic disk media in one cartridge case (for example, see JP 2004-22011A). This technique introduces magnetic attraction produced by a spindle of a magnetic disk drive, which acts on an end of the lowermost of center cores that collectively support the plurality of magnetic disk media at their central holes, thereby providing a simultaneous rotation for each magnetic disk medium. In this way, it is possible to improve speed of data transmission by accessing the plurality of magnetic disk media with a plurality of magnetic heads, respectively.

Patent document 1: Japanese Published Patent Application 2004-22011

However, the magnetic disk cartridge disclosed in the patent document 1 has a drawback that rotation of the recording disk media falls unstable when their axial distance increases according to their number. The reason for this is attributed to the fact that only the one end of the center core is magnetically attracted by the spindle.

The present invention seeks to provide a recording disk cartridge which is able to provide stable rotation for recording disk media even if their number is increased.

SUMMARY OF THE INVENTION

It is an aspect of the present invention to provide a recording disk cartridge, which includes a plurality of flexible recording disk media, a rotational member, and a cartridge case. The rotational member holds the recording disk media so that the recording disk media simultaneously rotate. The cartridge case provides a rotationally free housing for the recording disk media and the rotational member. The cartridge case has an opening to allow an end portion of the rotational member to be exposed to an outside of the cartridge case. The recording disk cartridge has an elastic member which provides a force to thrust the rotational member toward the opening.

In the recording disk cartridge described above, the elastic member thrusts the rotational member against the spindle, when the spindle is engaged with the rotational member. In this way, because the rotational member and the spindle are tightly engaged, it is possible to stabilize rotation of the recording disk media if their number is increased.

It is another aspect of the present invention to provide a recording disk cartridge further including a supporting shaft. The supporting shaft is positioned in a center of the rotational member on an opposite side of the end portion and is slidably inserted in the rotational member in its axial direction. An end of the supporting shaft abuts the cartridge case. The elastic member is disposed between the supporting shaft and the rotational member so that the elastic member thrusts the rotational member toward the opening.

In the recording disk cartridge described above, the elastic member supported by the supporting shaft, which is in contact with the cartridge case, thrusts the rotational member against the spindle, so that the rotational member and the spindle are tightly engaged. When the rotational member is supported by the spindle, the elastic member thrusts not only the rotational member but also the supporting shaft against the cartridge case. In this way, it is possible not only to establish a center of rotation for the rotational member (each recording disk medium), but also to restrict its off-center, which provides more stabilization for rotation of the rotational member.

It is still another aspect of the present invention to provide a recording disk cartridge further including an abrasion resistant member. The abrasion resistant member is provided for at least one of the supporting shaft and a contacting portion of the cartridge case.

The recording disk cartridge described above restrains abrasion occurring in the supporting shaft or the cartridge case, thereby increasing its durability.

It is yet another aspect of the present invention to provide a recording disk cartridge, the rotational member of which includes center cores that are provided for the respective recording disk media. The center cores are stacked so as to be deprived of relative rotations.

The recording disk media described above allows easy modification in the number of recording disk media if a new number of sets for a recording disk medium and a center core is selected.

The present invention, which has the elastic member that thrusts the rotational member against the spindle entering the opening, allows the rotational member and the spindle to tightly engage with each other. Therefore, it is possible to stabilize rotation of the recording disk media even if their number is increased.

DESCRIPTION OF THE PREFERRED EMBODIMENTS

Here will be described an embodiment of the present invention in detail, referring to drawings as needed. In the embodiment will be described a case of adopting a magnetic disk medium as an example of a recording disk medium.

Meanwhile, in a description below, with respect to up/down directions, making it a standard a typical use state of the magnetic disk cartridge, vertical directions for faces of magnetic disk media are called the up/down directions for convenience.

Figure 1:
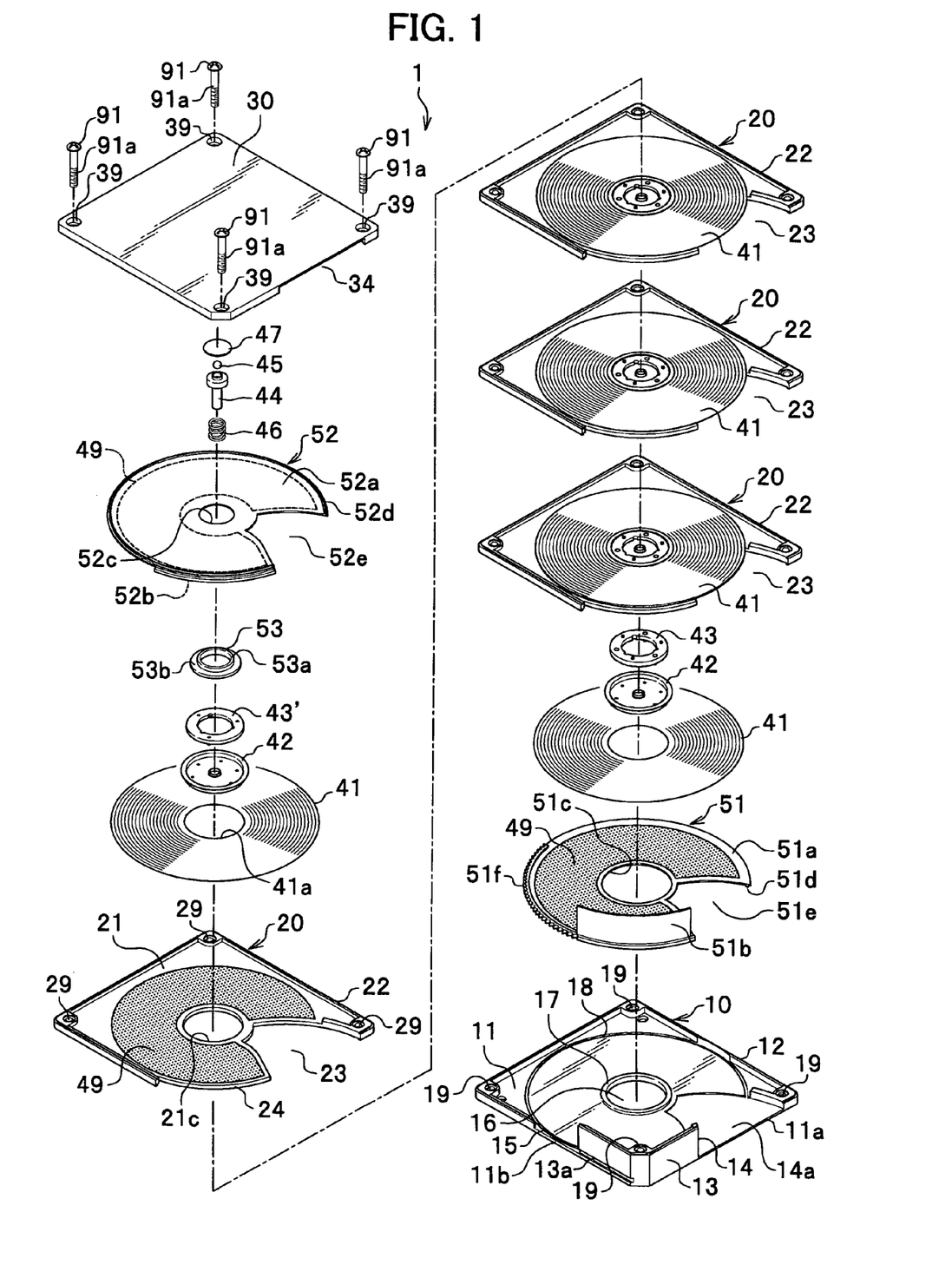
FIG. 1 is an exploded perspective view of a magnetic disk cartridge related to an embodiment of the present invention.

As shown in FIG. 1, in a magnetic disk cartridge 1 of an example of a recording disk cartridge are stacked a lower plate 10 for configuring a lower wall thereof; a plurality of, for example, four inner plates 20, and an upper plate 30 for configuring an upper wall thereof in this order; these are fastened and fixed with four screws 91; and thereby a cartridge case 2 (see FIG. 2A) is configured. Between the lower plate 10 and the lowermost inner plate 20, between any adjacent two of the four inner plates 20, and between the uppermost inner plate 20 and the upper plate 30 is arranged a magnetic disk medium 41, respectively. Each magnetic disk medium 41 is a disc form having an opening 41a at center thereof, and a center core (rotational member) 42 made of metal is affixed at rim of the opening 41a. It is designed that any adjacent two center cores 42 are engaged by spacers (rotational member) 43, 43', and that five magnetic disk media 41 (the magnetic disk media 41 stacked and integrated are assumed to be a disk stack 40) are integrally rotated.

Figure 2A:
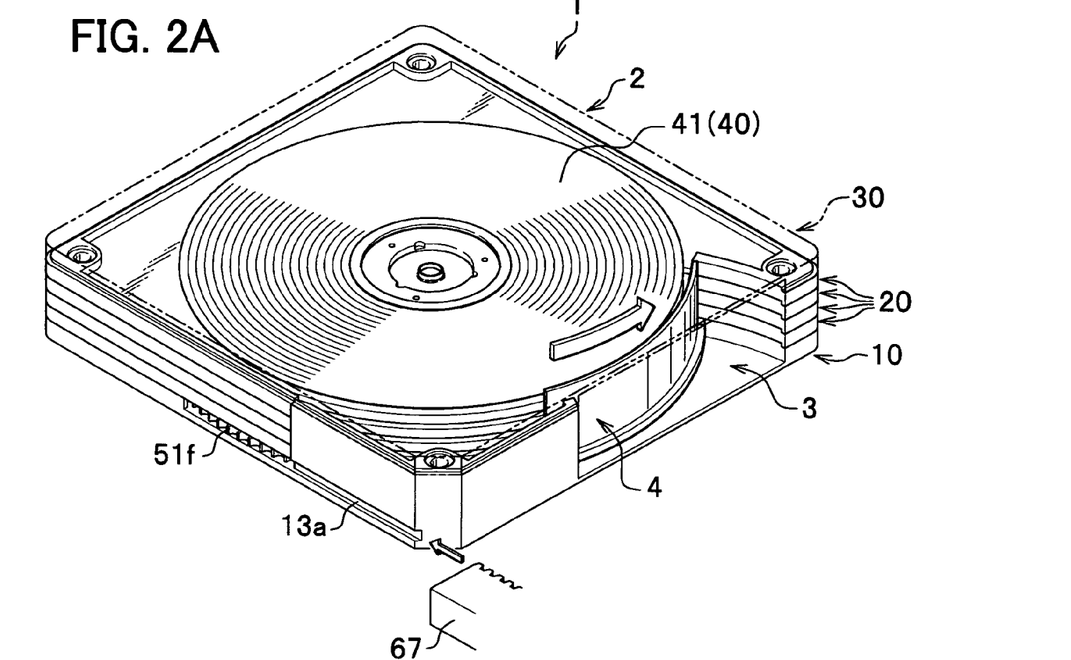
FIG. 2A is an external perspective view of a magnetic disk cartridge with a shutter closed related to an embodiment of the present invention.

In each of the inner plates 20 is formed a rib 22 for abutting with upper/lower plates at a peripheral rim of a flat main plate 21. Part of a right near side of each of the inner plates 20 in FIG. 1 forms a notch 23 so that magnetic heads 63 (see FIG. 4) can easily move onto the magnetic disk media 41. At the portion of the notch 23 is not formed the rib 22, and therefore, when the inner plates 20 are stacked up, an opening 3 is formed on a side face of the cartridge case 2 as shown in FIG. 2A.

The opening 3 is opened and closed by a shutter 4 that coaxially rotates with the disk stack 40. As shown in FIG. 1, the shutter 4 is configured by combining a lower rotor 51 and an upper rotor 52.

Next will be described each member in more detail.

The lower plate 10 is designed at a peripheral rim of a main plate 11 of a substantially square to mainly form a side wall 13 and a rib 12 for abutting with a lower face of the rib 22 of the lowermost inner plate 20. The side wall 13 is vertically provided in a predetermined range, for example, around one third range of one edge, from one corner of the main plate 11 (near side corner in FIG. 1), and is formed approximately in height of the inner plates 20 stacked.

A sector portion toward a center of the main plate 11 from one edge 11a (one edge of right near side in FIG. 1) continuing into the side wall 13 of the main plate 11 is designed to form a depression 14a lowered by one step, not to form the rib 12 at the peripheral rim of the main plate 11, and to become an opening 14. Thus it becomes easy for the magnetic heads 63 to proceed into the cartridge case 2.

An approximately central one third range of the other edge 11b (one edge of left near side in FIG. 1) continuing into the side wall 13 of the main plate 11 is designed not to form the rib 12 but to become an opening 15 so that a gear 51f of the lower rotor 51 described later can be exposed. In addition, outside the side wall 13 of the other edge 11b is formed a groove 13a along a periphery of the lower plate 10, continuing into the opening 15. The groove 13a is designed to be a passage where a shutter open gear 67 (see FIG. 2A) of a magnetic disk drive proceeds in a direction shown in an arrow of FIG. 2A and enters in the opening 15 in order to engage in the gear 51f.

The rib 12 is formed so as to protrude upward across all periphery except the side wall 13 and the openings 14, 15 out of a peripheral rim of the main plate 11. At center of the main plate 11 is formed a circular opening 16 for exposing the center core 42 provided inside the lowermost magnetic disk medium 41. At upper rim of the opening 16, across all periphery thereof is formed a rib 17 outside which a central opening 51c formed at center of the lower rotor 51 fits. The rib 17 rotationally freely supports the lower rotor 51.

In addition, on an upper face (inner face) of the main plate 11 is formed a circular lower rotor support groove 18 at a position corresponding to peripheral rim of the lower rotor 51. The lower rotor support groove 18 rotationally freely supports the lower rotor 51 coaxially with the magnetic disk media 41 by engaging in a rib 51d (see FIG. 4) formed downward at a peripheral rim of the lower rotor 51.

In addition, at four corners of the main plate 11 are formed screw holes 19 where female threads are formed, respectively, with penetrating through the up/down directions.

The main plate 21 of each of the inner plates 20 is substantially a square, and a portion corresponding to one of four corners of the square is designed to be an arc (arc portion 24) one size larger than the magnetic disk medium 41. At one edge (right near side in FIG. 1) continuing into the arc portion 24 is formed the notch 23 into a sector. The rib 22 protrudes the up/down directions and is formed across all periphery except the arc portion 24 and the notch 23 out of periphery rim of the main plate 21. At center of the main plate 21 is formed a central opening 21c for enabling the upper center core 42 to be exposed and to be coupled with the lower center core 42.

In addition, at three corners of the main plate 21, with penetrating through the three corners in the up/down directions, are formed holes 29 through which screw shaft portions 91a of the screws 91 are inserted, respectively.

Figure 3:
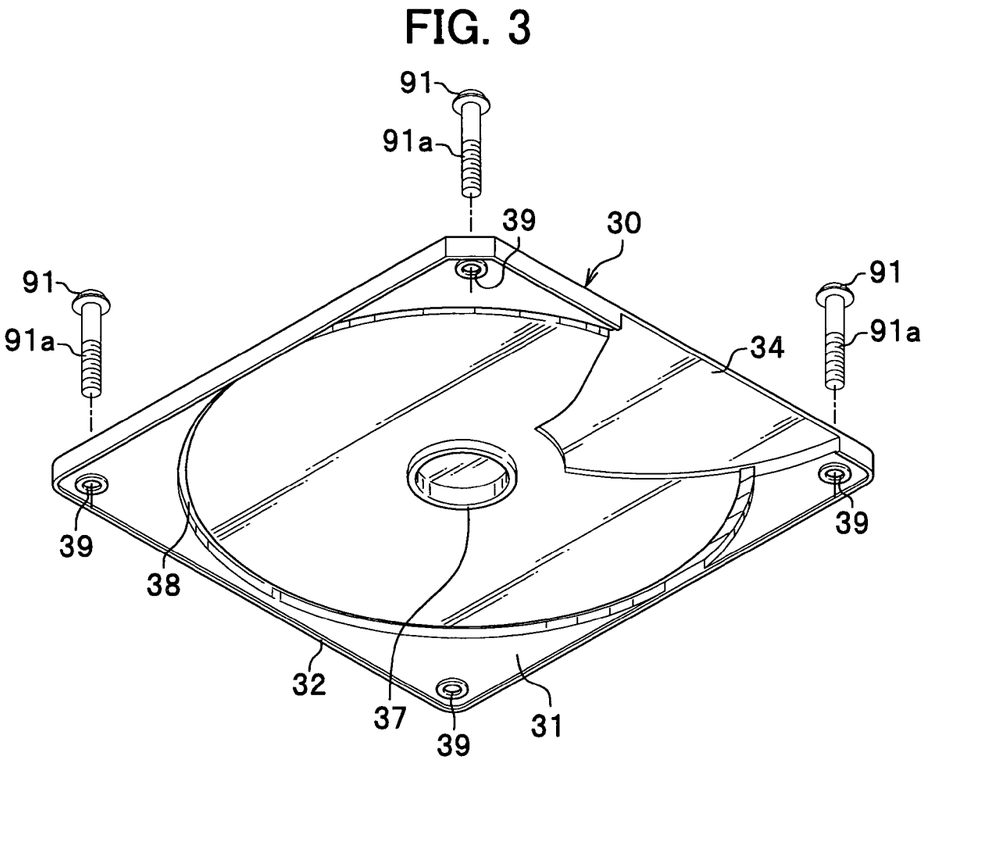
FIG. 3 is a perspective view showing an inner face of an upper plate.

The upper plate 30 is formed substantially symmetric to the lower plate 10. As shown in FIG. 3, in the upper plate 30, on a substantially square main plate 31 are formed a depression 34 corresponding to the depression 14a, a rib 37 corresponding to the rib 17, and an upper rotor support groove 38 corresponding to the lower rotor support groove 18. Meanwhile, at center of the main plate 31 are not formed an opening and a side wall corresponding to the side wall 13.

In addition, at a peripheral rim of the main plate 31, across all periphery except the depression 34 is formed a rib 32 protruding downward.

In addition, at four corners of the main plate 31 are respectively formed holes 39 that enable the screw shaft portions 91a of the screws 91 to be penetrated therethrough.

The lower rotor 51 is designed so that: a central opening 51c, a notch 51e, a rib 51d, and the gear 51f are formed on a ring-form lower rotor plate 51a substantially same as the magnetic disk media 41; and a shutter plate 51b is vertically provided at the peripheral rim of the lower rotor plate 51a. The central opening 51c is formed as a circle fitting outside the rib 17, the notch 51e is formed as a sector corresponding to the depression 14a. In addition, the rib 51d is provided downward at a peripheral rim of a lower face of the lower rotor plate 51a, corresponding to the lower rotor support groove 18.

The shutter plate 51b is a blocking member for blocking the opening 3 (see FIG. 2A) and the disk stack 40 and is vertically provided along the peripheral rim of the lower rotor plate 51a with neighboring the notch 51e. The gear 51f is an engaged portion for opening/closing the shutter 4 (see FIG. 2A) from outside of the magnetic disk cartridge 1, and is formed at a peripheral rim of the lower rotor plate 51a within a predetermined range with neighboring the shutter plate 51b.

The upper rotor 52 is designed to be substantially symmetric to the lower rotor 51: the upper rotor 52 comprises an upper rotor plate 52a similar to the lower rotor plate 51a; on the upper rotor plate 52a are formed a central opening 52c fitting outside the rib 37 of the upper plate 30, a notch 52e corresponding to the depression 34, and a rib 52d corresponding to the upper rotor support groove 38. In addition, at a portion adjacent to the notch 52e of a peripheral rim of the upper rotor plate 52a is formed a shutter groove 52b, corresponding to the shutter plate 51b of the lower rotor 51. The lower rotor 51 and the upper rotor 52 are designed to integrally rotate by the shutter groove 52b and upper end rim of the shutter plate 51b engaging.

The upper rotor 52 is rotationally freely supported by the upper plate 30 by the central opening 52c fitting outside the rib 37 of the upper plate 30, and the rib 52d engaging in the upper rotor support groove 38. Meanwhile, the upper rotor 52 is prevented from dropping from the upper plate 30 by a stop member 53. The stop member 53 comprises a cylindrical portion 53a inserted in the rib 37 (see FIG. 3) and a flange 53b formed at one end of the cylindrical portion 53a; the cylindrical portion 53a is inserted in the central opening 52c from a lower side of the upper rotor 52 and is fixed at the rib 37 by ultrasonic welding, adhesion, and the like.

Figure 5:
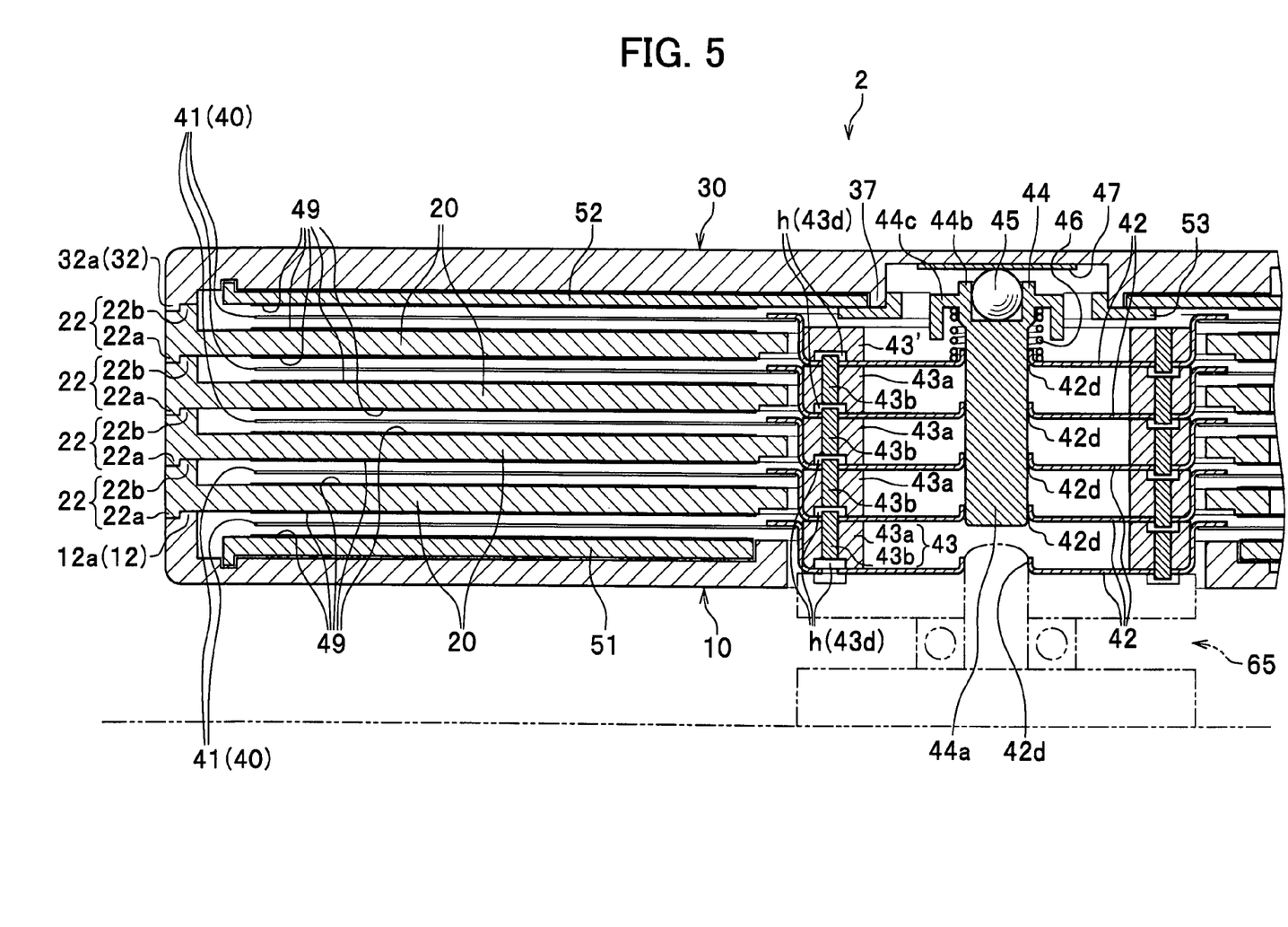
FIG. 5 is a partially enlarged drawing of FIG. 4.

As an enlarged section drawing shown in FIG. 5, an upper face of the lower rotor 51, upper and lower faces of the inner plates 20, and a lower face of the upper rotor 52 are faces opposing the magnetic disk media 41, where liners 49 are affixed across portions opposing the media 41, respectively.

The liners 49 consist of, for example, a non-woven cloth such as a polyester fiber and a blended fabric fiber of rayon and polyester Next will be described a stack structure of the lower plate 10, the inner plates 20, and the upper plate 30.

In the rib 12 of the lower plate 10, as shown in FIG. 5, an inside thereof is formed higher by one step than an outside thereof, and thereby a male type step portion 12a is formed; each rib 22 of the inner plates 20 forms a female type step portion 22a protruding downward at outermost periphery, and thus a periphery of the male type step portion 12a and an inner perimeter of the female type step portion 22a become able to be fitted. In addition, when the lower plate 10, the inner plates 20, and the upper plate 30 are fastened by the screws 91 (see FIG. 1), an upper face of the male type step portion 12a and a corresponding portion of a lower face of the lowermost inner plate 20 are designed to be contacted. Thus, because the rib 12 of the lower plate 10 and the rib 22 of the inner plate 20 are sealingly abutted and fitted each other, an invasion of dust into the cartridge case 2 from outside is prevented.

Similarly, any adjacent two of the inner plates 20, and the uppermost inner plate 20 and the upper plate 30 are stacked by being sealingly abutted and fitted each other. In other words, on an upper face of each of the inner plates 20 is formed a male type step portion 22b where an inside of the upper face is formed higher by one step; at a rib 32 of the upper plate 30 is formed a female type step portion 32a of which outermost periphery protrudes downward by one step. And the male type step portion 22b of one inner plate 20 and the female type step portion 22a of an upper adjacent inner plate 20 are sealingly abutted and fitted each other; the male type step portion 22b of the uppermost inner plate 20 and the female type step portion 32a of the upper plate 30 are sealingly abutted and fitted, and stacked. Thus any adjacent two of the ribs 12, 22, 32 are sealingly abutted and fitted each other, and dust from outside is prevented from invading into the cartridge case 2. In addition, as soon as the lower plate 10, the inner plates 20, and the upper plate 30 are stacked, the side wall of the cartridge case 2 is configured.

In addition, both of the female type step portion 22a and the male type step portion 22b protrude from the main plate 21 beyond a thickness of the liner 49. Therefore, after affixing the liners 49 on the inner plates 20 and making an assembly, then even if placing it on a work bench, the liners 49 do not contact the work bench, and accordingly, are not contaminated with dust and the like.

Such the configuration of the cartridge case 2 by stacking the inner plates 20 facilitates a change of a number of the magnetic disk media 41; although a height change of the side wall 13 and that of the shutter plate 51b are requested, a number of housing units of the magnetic disk media 41 formed within the cartridge case 2 can be changed only by mainly changing a number of the inner plates 20.

Next will be described the magnetic disk media 41 and a stack structure thereof. The magnetic disk media 41 are ones where magnetic paint is coated on both faces of a resin sheet, for example, such as polyester.

Figure 6:
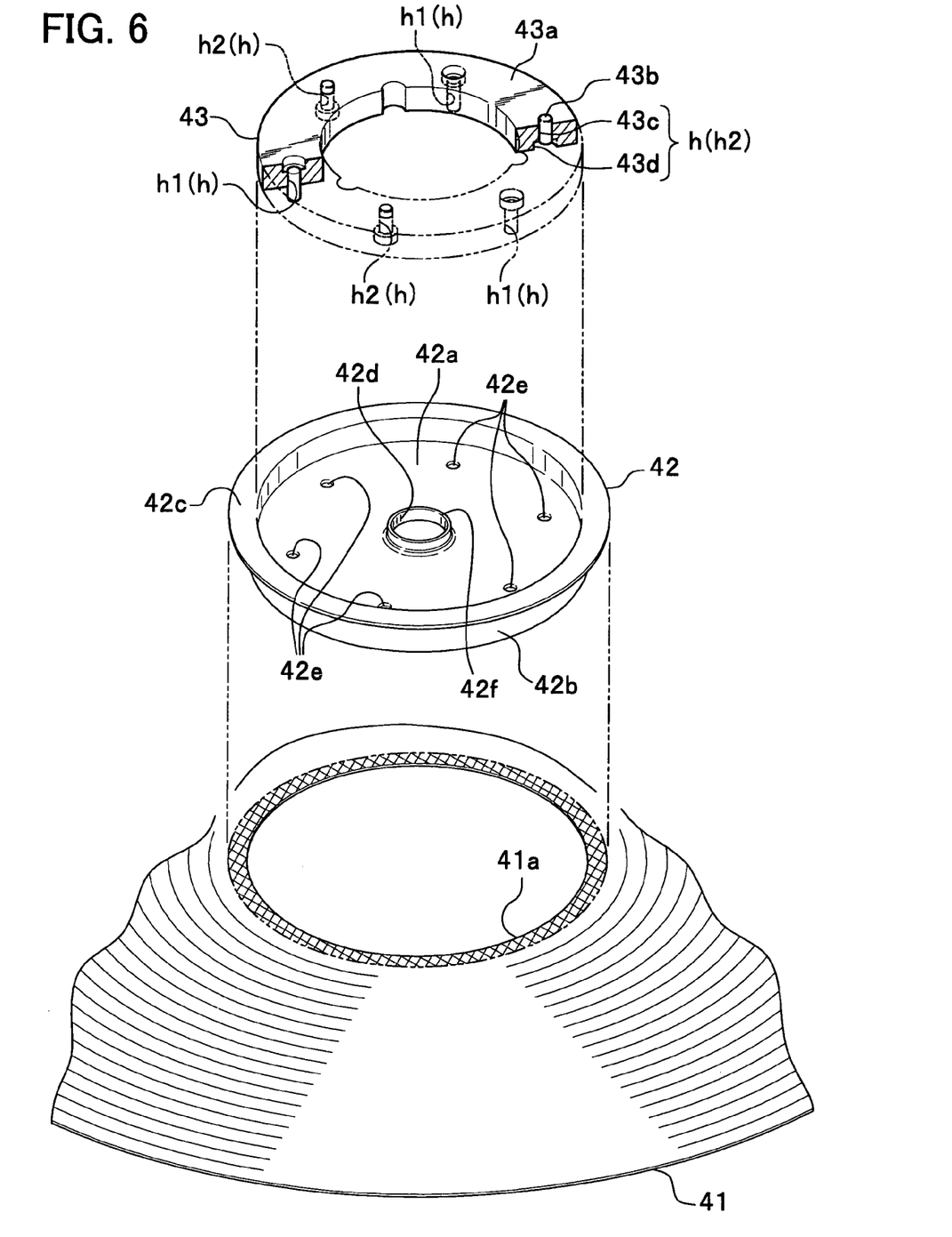
FIG. 6 is an exploded perspective view showing a stack structure of magnetic disk media.

As shown in FIG. 6, each of the center cores 42 is one substantially made a hat form with draw forming a metal plate by press: the center core 42 is mainly configured of a circular bottom plate 42a, a low cylindrical side wall 42b rising from peripheral rim of the bottom plate 42a, and a flange 42c widening in an outer diameter direction from an upper end of the side wall 42b. At center of the bottom plate 42a is formed a center hole 42d, and at rim of the plate 42a are formed six small holes 42e at a distance of 60 degrees, making the center hole 42d a center thereof.

A spacer 43 is provided between adjacent center cores 42, keeps a distance of each of the center cores 42, stops a rotation between each of the center cores 42, and functions so that the stacked magnetic disk media 41 integrally rotate. The spacer 43 is mainly configured of a main body portion 43a shaped like a ring from a resin and metallic pins 43b pressed into the main body portion 43a. In the main body portion 43a are formed six penetration holes h at positions corresponding to the small holes 42e of the center core 42, wherein each of the penetration holes h consists of a small diameter hole portion 43c, where the pin 43b is pressed, and a large diameter hole portion 43d that is coaxial with and slightly larger in diameter than the small diameter hole portion 43c. The six penetration holes h are designed to be upside down in any two adjacent ones. In other words, penetration holes h2 of both adjacent penetration holes h1, where each the large diameter hole portion 43d is positioned at an upper side thereof, are arranged so that the large diameter hole portion 43d is positioned at a lower side thereof.

Into each of the small diameter portions 43c is pressed each one pin 43b from upper/lower sides thereof, one end of the pin 43b is positioned at a boundary of the large diameter hole portion 43d and the small diameter hole portion 43c, and the other end thereof protrudes outside the small diameter portion 43c. The large diameter hole portion 43d serves a function of a clearance at ends of pins 43b of adjacent spacers 43.

As shown in FIG. 5, such the spacers 43 are provided between adjacent center cores 42, respectively. One pin 43b protruding toward a lower side of each of the spacers 43 enters in a small hole 42e of one center core 42 at the lower side of the spacer 43, and stops a rotation relative to the center core 42 at the lower side. If there is another spacer 43 at a still lower side than the center core 42 at the lower side, a floating-up of the spacer 43 for the center core 42 is prevented by the pin 43b entering the large diameter hole portion 43d in the spacer 43 at the lower side. The other pin 43b protruding toward an upper side of the spacer 43 enters in a small hole 42e of the other center core 42 at the upper side of the spacer 43, and stops a rotation relative to the center core 42 at the upper side. If there is another spacer 43 at a still upper side than the center core 42 at the upper side, the top end of the pin 43b enters in the large diameter hole portion 43d in the spacer 43 at the upper side.

Meanwhile, because at an upper side the uppermost center core 42 has no center core 42 to stop a rotation thereof, at the upper side is arranged a thin top spacer 43' in thickness where the pin 43b is protruded only downward.

The magnetic disk media 41 thus stacked, namely, the disk stack 40, are stably supported in rotation by a coupling shaft (supporting shaft) 44, a bearing ball 45, a compression coil spring (elastic member) 46, and a center plate 47.

As shown in FIG. 5, the coupling shaft 44 lessens a central fluctuation between the center cores 42 stacked, holds the bearing ball 45 and the compression coil spring 46, and comprises a shaft portion 44a, a ball holding portion 44b, and a spring holding portion 44c. The shaft portion 44a is a columnar form, which can be inserted through the center holes 42d of the center cores 42. And the shaft portion 44a is slidably inserted in the center holes 42d (more specifically speaking, a flange 42f projecting upward around the center hole 42d, as shown in FIG. 6) in an axial direction of the center cores 42. At an upper end of the shaft portion 44a the ball holding portion 44b is formed into a cylindrical form with a bottom opening to an upper side thereof. Because a depth of the ball holding portion 44b is larger than a radius of the bearing ball 45 and smaller than its diameter, the bearing ball 45 is not only stably held at the ball holding portion 44b but also in point-contact with the center plate 47 on the upper plate 30. The spring holding portion 44c consists of a form where a cylindrical form with a bottom is turned down at a side of an outer diameter of the ball holding portion 44b, and the compression coil spring 46 is arranged in a cylindrical space between the shaft portion 44a and the spring holding portion 44c. Meanwhile, although a length of the coupling shaft is 44 is arbitrary, in the embodiment it is one reaching the second center core 42 from the lowermost one; the center hole 42d of the lowermost center core 42 is opened so that a spindle 65 of a magnetic disk drive can proceed.

The center plate 47 is a slide member affixed at a center of an inner face of the upper plate 30, that is, on a flat face of an inside of the rib 37. The center plate 47 can be composed of, for example, a material excellent in sliding ability and abrasion resistance such as polyoxymethylene and ultra high molecular weight polyethylene.

Although the bearing ball 45 consists of a sphere made of, for example, steel used for a ball bearing, it may also be composed of a material excellent in sliding ability and abrasion resistance, for example, such as polytetrafluoroethylene and polyoxymethylene. The bearing ball 45 is arranged within the ball holding portion 44b of the coupling shaft 44, abuts with the bottom face of the ball holding portion 44b; and a center of an inner face of the upper plate 30, that is, the center plate 47 by a point contact, and rotationally supports the disk stack 40.

In the compression coil spring 46 one end (upper end) is held by the spring holding portion 44c of the coupling shaft 44; the other end (lower end) abuts with an upper face of the uppermost center core 42, and energizes the stacked center cores 42 to the side of the lower plate 10, that is, to the side of the spindle 65 of the magnetic disk drive. Thus the center cores 42 do not jounce within the cartridge case 2, and the fluctuation of the magnetic disk media 41 is prevented in rotation thereof. In this connection, at the same time that the compression coil spring 46 downwardly thrusts the stacked center cores 42, which are supported by the lower plate 10 or the spindle 65, the stacked center cores 42 continuously thrust the coupling shaft 44 toward the upper plate 30. As a result, the bearing ball 45 is continuously in contact with the center plate 47.

Figure 4:
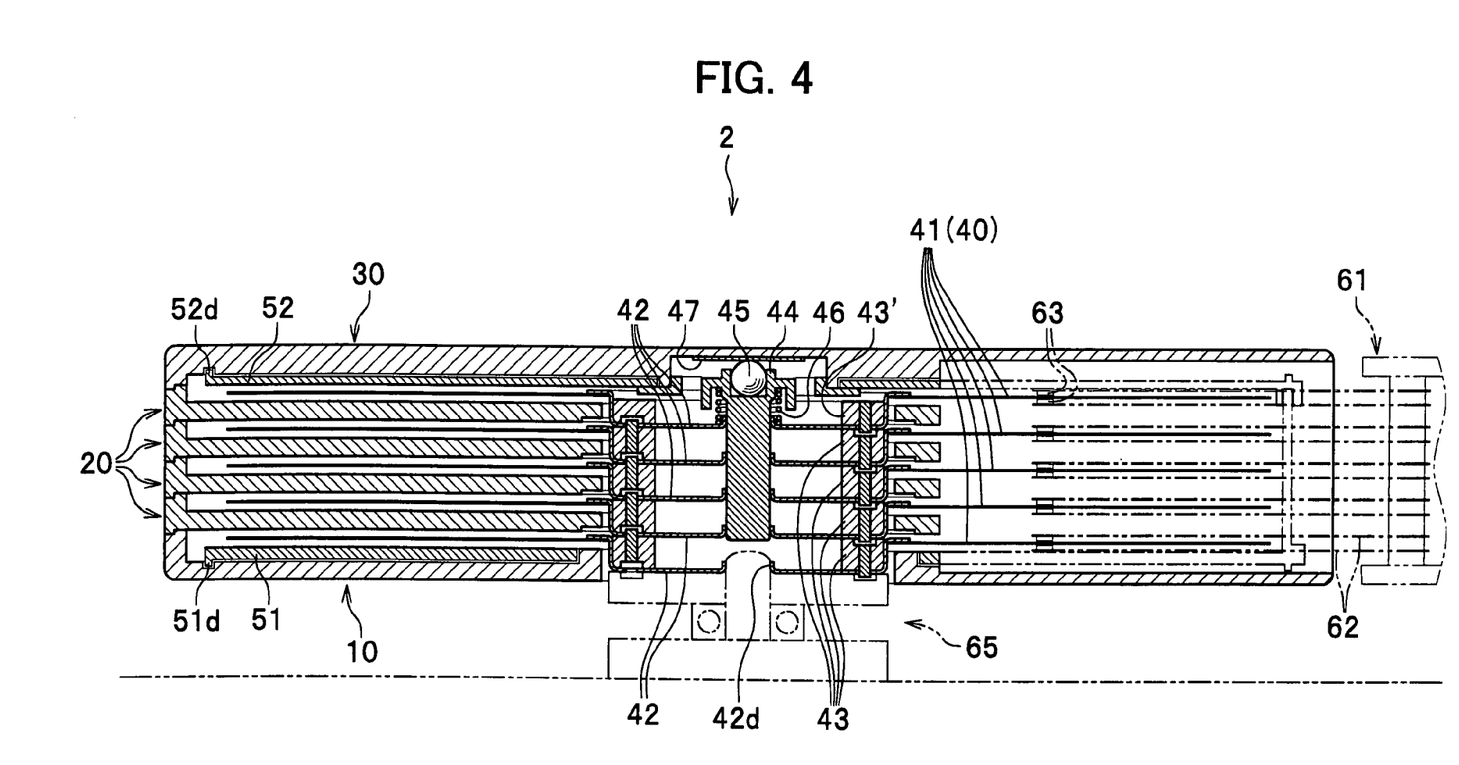
FIG. 4 is a section view taken along a line IV-IV in FIG. 2B of the magnetic disk cartridge loaded on a magnetic disk drive.

A magnetic disk drive for recoding/reproducing data for the magnetic disk cartridge 1 rotates, as shown in FIG. 4, the disk stack 40 by the spindle 65. The spindle 65 attracts the lowermost center core 42 by magnetic force, enters in the center hole 42d of the center core 42, and thereby matches an axis thereof with that of the disk stack 40. At this time, because the spindle 65 slightly lifts up the center cores 42 with resisting an energizing force of the compression coil spring 46, as shown in FIGS. 4 and 5, each of the magnetic disk media 41 is positioned at center of a space formed between the lower rotor 51 and the lowermost inner plate 20, between upper and lower inner plates 20, and between the uppermost inner plate 20 and the upper rotor 52. The magnetic heads 63 are provided at top ends of swing arms 62. Each of the magnetic heads 63 is arranged on both faces of each of the magnetic disk media 41.

Figure 2B:
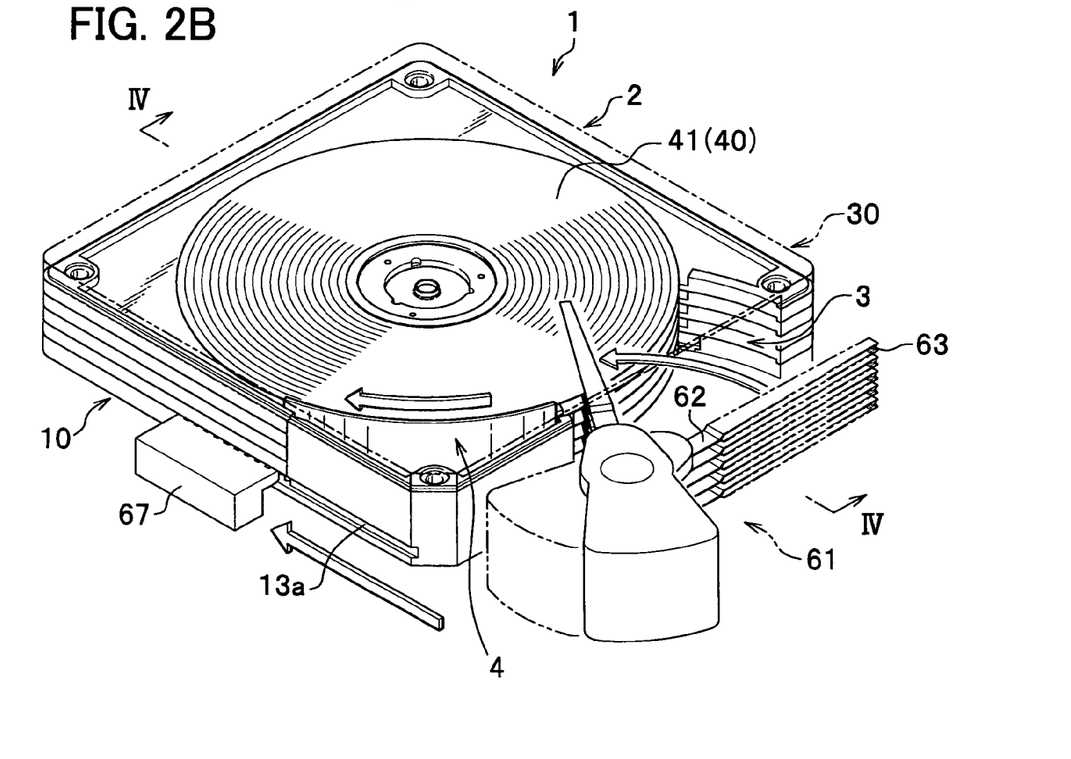
FIG. 2B is an external perspective view with the shutter opened related to the magnetic disk cartridge.

The magnetic disk cartridge 1 thus described can prevent, in no use thereof as shown in FIG. 2A, an invasion of dust thereto by closing the opening 3 with rotating the shutter 4 in a counterclockwise direction of the drawing; in use thereof as shown in FIG. 2B, when loaded on the magnetic disk drive, the shutter open gear 67 fits in the groove 13a, is guided thereby, engages in the gear 51f, and rotates the shutter 4 in a clockwise direction of the drawing.

As shown in FIG. 5, when the spindle 65 goes upward so as to magnetically attract the lowermost center core 42, the disk stack 40 is lifted to some extent by the spindle 65. Because this leads to further compression of the compression coil spring 46, which is set to be compressed in advance, the center core 42 is thrust with an appropriate pressure exerted by the spindle 65, so that the center core 42 is tightly engaged with the spindle 65. At the same time, because the coupling shaft 44 is also thrust by the compression coil spring 46 toward the upper plate 30, the bearing ball 45 is able to be in good contact with the center plate 47.

When the spindle 65 is rotated, which is engaged with the lowermost center core 42, the disk stack 40 stably rotates about a point contact between the bearing ball 45 and the center plate 47. Subsequently, the swing arms 62 driven by an actuator 61 make swing motion so as to place the magnetic heads 63 on the magnetic disk media 41.

When recording data on the magnetic disk media 41 with the magnetic heads 63, the data is recorded thereon by sending a signal to the magnetic heads 63 by a control circuit not shown; when reproducing data from the magnetic disk medium 41, a signal is output by detecting a change of a magnetic field on the medium 41 with the magnetic heads 63.

At this time, dust on the magnetic disk media 41 is removed by the liners 49 appropriately touching respective media 41.

After the use of the magnetic disk cartridge 1, the magnetic heads 63 are retracted from the cartridge case 2, thereafter ejects the magnetic disk cartridge 1; thereby the gear 51f is driven by the shutter open gear 67, and the shutter 4 closes the opening 3.

As described above, the embodiment of the present invention brings about following advantages.

Because the compression coil spring 46 thrusts the center core 42 against the spindle 65 of the magnetic disk drive, which enters the opening 16, the center core 42 is tightly engaged with the spindle 65. In this way, it is possible to stabilize rotation of the magnetic disk media 41, even if their number of disks is increased to five as shown in the embodiment described above.

When the center core 42 is supported by the spindle 65, the compression coil spring 46 thrusts not only the center core 42, but also the coupling shaft 44 (bearing ball 45) against the cartridge case 2. This provides a center of rotation for the disk stack 40, thereby further stabilizing rotation of the disk stack 40.

Because the center plate 47 as an abrasion resistant member is introduced, it is possible to provide better durability of the cartridge case 2 by restriction of its abrasion, in comparison with another cartridge case 2 which is in direct contact with a bearing ball 45.

Thus because the magnetic disk cartridge 1 has a plurality of the magnetic disk media 41, data transfer can be performed at a higher speed by simultaneously accessing data with a plurality of magnetic heads 63.

In addition, because the cartridge case 2 is configured by stacking up the inner plates 20, it is easy to perform a specification change of making a number of magnetic disk media 41 a different one. Then, in assembling the magnetic disk cartridge 1, because the magnetic disk media 41 can be handled with being placed on the inner plates 20 and the lower rotor 51 built in the lower plate 10, an occasion of touching the magnetic disk media 41 can be reduced and a quality of the cartridge 1 can be further stabilized.

In addition, because each of the inner plates 20 is stacked on the lower plate 10 or another inner plate 20 and is fixed, the magnetic disk cartridge 1 can make it higher a parallelism to the magnetic disk media 41, can stabilize a rotation of the media 41, and enable a higher speed rotation of the media 41, furthermore a higher speed of a data transfer.

Thus, although the embodiment of the present invention is described, the invention is not limited thereto and can be embodied with being changed as needed. For example, although in the embodiment the magnetic disk medium 41 is applied to a recording disk medium, an optical recording medium where data is recorded by light can also be applied thereto.

In addition, although in the embodiment the lower plate 10, the inner plates 20, and the upper plate 30 are fastened and fixed by the screws 91, they can also be integrally fixed by any of adhesion and deposition.

Figure 7:
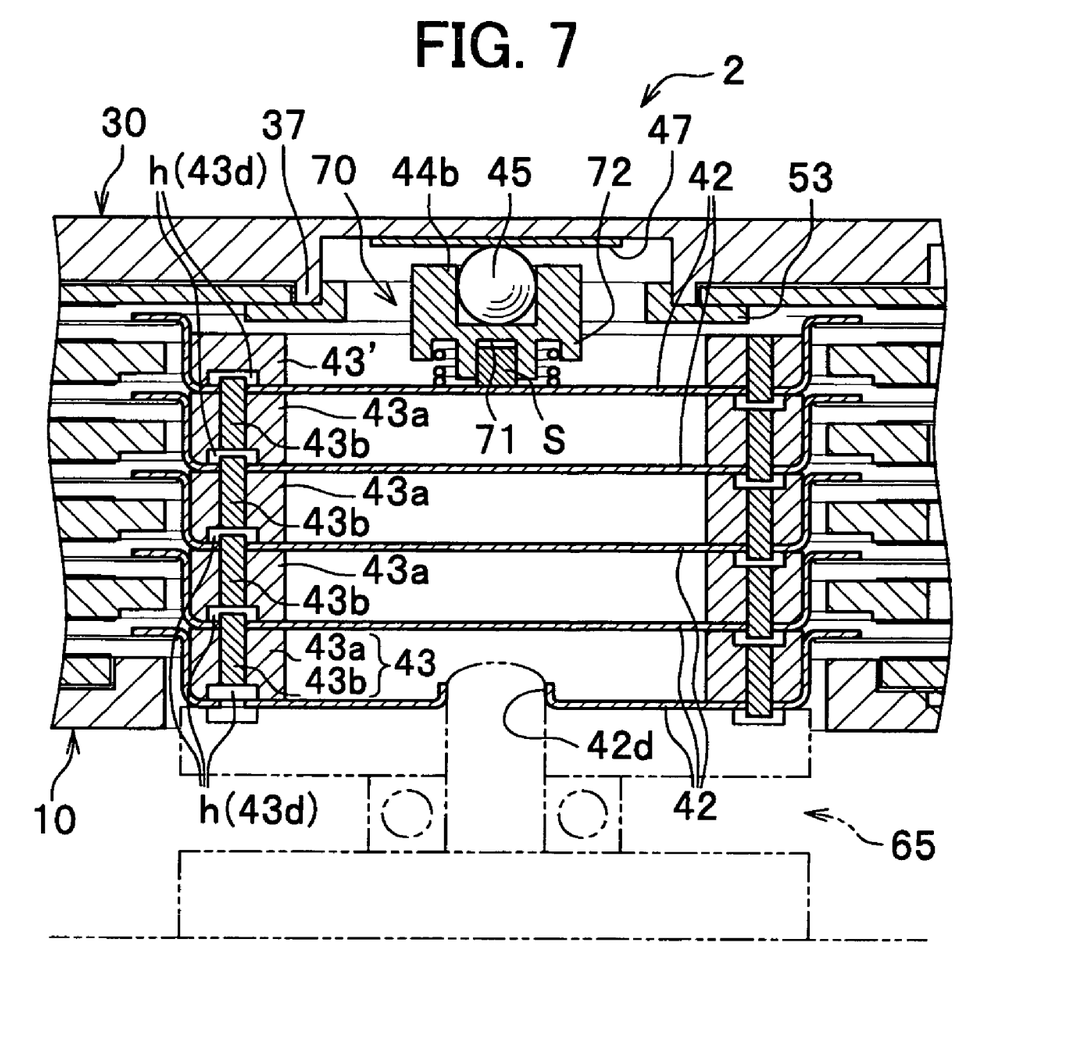
FIG. 7 is a sectional view showing a setup having a sliding shaft instead of a center hole in a center of a center core.

The recording disk cartridge according to the embodiment described above has the coupling shaft 44 which is inserted through the center hole 42d so as to be slidable relative to the center cores 42. The invention is not limited to this. As shown in FIG. 7 for example, it may be alternatively possible to adopt a setup, which includes a sliding shaft S and a coupling shaft 70. The sliding shaft S, which is cylindrical and projects upward, is disposed at a center of the uppermost center core 42, which does not have a center hole 42d. The coupling shaft 70 is adapted to slide relative to the sliding shaft S. In this connection, the coupling shaft 70 has a portion, which is similar to an upper end portion (ball holding portion 44b) separated from the coupling shaft 44 shown in the embodiment described above. Under this portion the coupling shaft 70 further has a sliding portion 71 and a spring holding portion 72. The sliding portion 71 is like a cylinder with a bottom, into which the sliding shaft S is slidably inserted. The spring holding portion 72, which is similar to the spring holding portion 44c shown in the embodiment described above, is formed around the sliding portion 71. Because this setup does not require a center hole 42d made by burring for center cores 42 except for a lowermost center core 42, it may render fabrication easier. However, because it is necessary to prepare three types of center cores 42, one type coupled with a sliding shaft S, one type without a center hole 42d and the other type with a center hole 42d, it may be preferable in terms of cost to select the embodiment described above.

Figure 8:
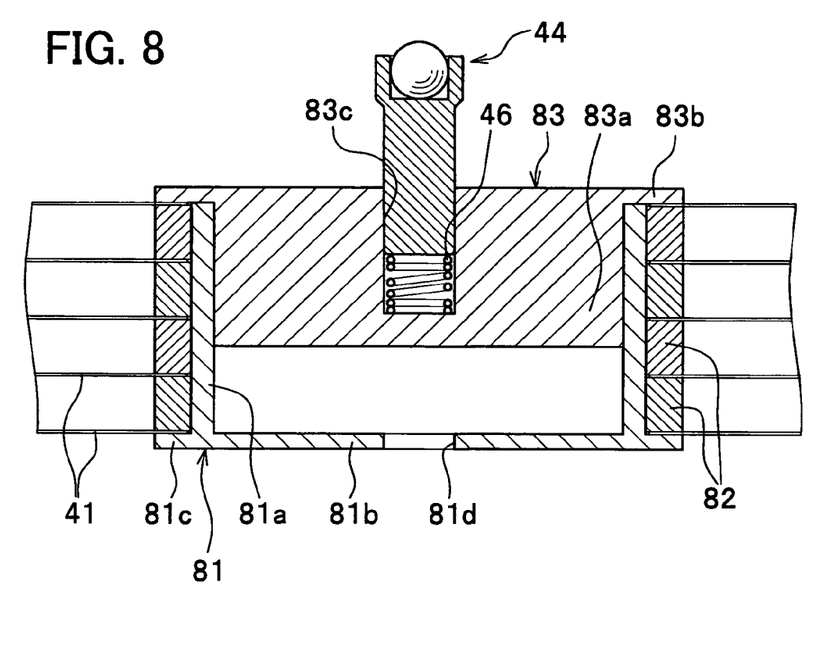
FIG. 8 is a sectional view showing a setup having a hub, spacer rings and a clamper.

Although the embodiment described above employs a setup of stacked center cores 42 for a rotational member, it is alternatively possible to adopt another setup. For example, it is possible to adopt a rotational member as shown in FIG. 8, which includes a hub 81, a spacer ring 82 and a clamper 83. The hub 81, which is like a cylinder with a bottom made of magnetic material, includes a cylinder 81a, a bottom 81b formed at a lower end of the cylinder 81a and a flange 81c which externally extends from an external circumference of the bottom 81b. The bottom 81b has a spindle hole 81d, through which a spindle of magnetic disk drive is inserted. A spacer ring 82 is a ring-shaped member disposed between adjacent magnetic disk media 41 so as to space them with a predetermined distance. The clamper 83 has a mating portion 83a which mates with an inner surface of the cylinder 81a of the hub 81, and a flange 83b which extends from an upper end portion of the mating portion 83a. Magnetic disk media 41 and spacer rings 82 are mounted about the cylinder 81a of the hub 81 one by one. Subsequently, the clamper 83 is mated with the cylinder 81a. In this way, the magnetic disk media 41 are supported between the flange 81c and the flange 83b so that any adjacent magnetic disk media 41a are spaced with the predetermined distance.

In this setup described above, a magnetic disk medium 41 is secured to a spacer ring 82 so as to prevent their rotational displacement. Furthermore, uppermost and lowermost magnetic disk media 41 are secured to the flange 83b of the clamper 83 and the flange 81c of the hub 81, respectively. It may be possible to select any type of method for fixing, such as adhesion by an adhesive and pins 43b for preventing relative rotation as shown in the embodiment described above.

If the rotational member described above is selected, it may be possible to bring about similar advantages to those obtained by the embodiment described above. In this case, as shown in FIG. 8, a sliding hole 83c, which is a cylinder with a bottom, is bored in a center of the clamper 83. The coupling shaft 44, which is similar to that shown in the embodiment described above (except for having no spring holding portion 44c), is slidably received by the sliding hole 83c. And a compression coil spring 46 is placed between a lower surface of the coupling shaft 44 and the bottom of the sliding hole 83c. However, taking into account a merit described below, it may be preferable to select the setup shown in the embodiment described above. The setup having the stacked center cores 42 according to the embodiment allows handling of an inner plate 20 (or a lower rotor 51) and a magnetic disk medium 41 as one unit during assembly, which may render assembly work easier.

Figure 9:
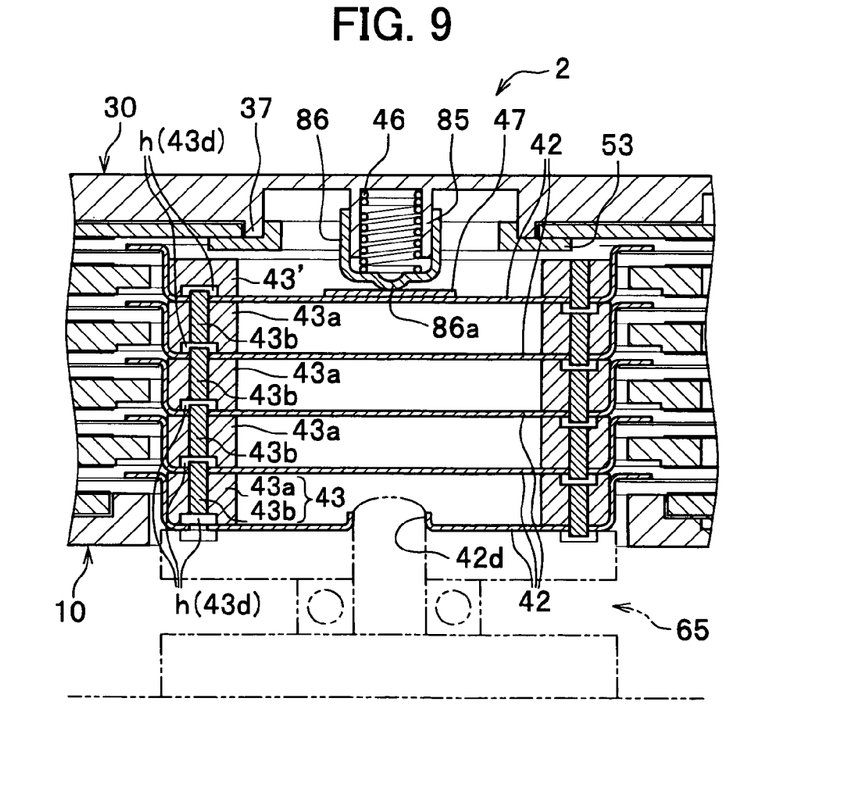
FIG. 9 is a sectional view showing a setup, in which a spindle instead of a bearing ball thrusts a disk stack.

In the embodiment described above, the bearing ball 45 disposed on an upper end of the coupling shaft 44 is in point contact with the center plate 47 on the upper plate 30. The present invention is not limited to this setup. For example as shown in FIG. 9, it may be alternatively possible to adopt another setup, which includes a sliding member 85, a receiving member 86 (abrasion resistant member), a compression coil spring 46 and a center plate 47. The sliding member 85, which is a cylinder with a bottom, extends from a center of an upper plate 30. The receiving member 86, which is a cylinder with a bottom, slidably receives the sliding member 85 in contact with an outer surface of the sliding member 85. The compression coil spring 46, which is disposed between the sliding member 85 and the receiving member 86, thrusts the receiving member 86 toward center cores 42. The center plate 47, which is disposed in a center of an uppermost center core 42, is slidably in contact with the receiving member 86. This setup, in which a spindle 65 thrusts the stacked center cores 42, is able to stabilize rotation of a disk stack 40. However, because the setup employs point contact between the receiving member 86 and the center plate 47, it is preferable but not necessary to form a projection 86a on a bottom of the receiving member 86.

Foreign priority document, JP 2004-238652 filed on Aug. 18, 2004, is hereby incorporated by reference.

What is claimed is:

1. A recording disk cartridge comprising:
a plurality of flexible recording disk media;
a rotational member for holding the recording disk media so that the recording disk media simultaneously rotate;
a cartridge case for providing a rotationally free housing for the recording disk media and the rotational member, the cartridge case having an opening to allow an end portion of the rotational member to be exposed to an outside of the cartridge case; and
a supporting shaft, which is positioned in a center of the rotational member on an opposite side of the end portion, the supporting shaft being slidably inserted in the rotational member in an axial direction thereof, an end of the supporting shaft abutting the cartridge case,
wherein the recording disk cartridge has an elastic member which provides a force to thrust the rotational member toward the opening, and
wherein the elastic member is disposed between the supporting shaft and the rotational member so that the elastic member thrusts the rotational member toward the opening.

2. A recording disk cartridge according to claim 1, wherein the rotational member comprises center cores which are provided for the respective recording disk media, and the center cores are stacked so as to be deprived of relative rotations.

3. A recording disk cartridge according to claim 2, wherein the rotational member further comprises pins for preventing the relative rotations of the center cores.

4. A recording disk cartridge according to claim 1, wherein each recording disk medium comprises a magnetic disk medium.

5. A recording disk cartridge according to claim 1, wherein each recording disk medium comprises an optical disk medium.

6. A recording disk cartridge according to claim 1, further comprising an abrasion resistant member,
wherein the abrasion resistant member is provided for at least one of the supporting shaft and a contacting portion of the cartridge case.

7. A recording disk cartridge according to claim 6, wherein the rotational member comprises center cores which are provided for the respective recording disk media, and the center cores are stacked so as to be deprived of relative rotations.

8. A recording disk cartridge according to claim 7, wherein the rotational member further comprises pins for preventing the relative rotations of the center cores.

* * * * *